United States Patent [19]

Davis et al.

[11] Patent Number: 4,631,737
[45] Date of Patent: Dec. 23, 1986

[54] SELF BIASING DIRECT COUPLED DATA LIMITER

[75] Inventors: Walter L. Davis, Coral Springs; Yolanda Prieto, Miami; George W. Smoot, Sunrise, all of Fla.

[73] Assignee: Motorola, Inc., Schaumburg, Ill.

[21] Appl. No.: 678,933

[22] Filed: Dec. 6, 1984

[51] Int. Cl.$^4$ .................. H04L 27/14; H04L 25/06; H04B 1/16
[52] U.S. Cl. .................................... 375/88; 455/343; 328/169; 307/351; 307/540; 307/358; 375/76
[58] Field of Search .............. 375/76, 80, 88; 455/38, 455/343; 328/169, 147, 171; 307/358, 351, 540, 555

[56] References Cited

U.S. PATENT DOCUMENTS 3,838,448  9/1974  Garde et al. .................... 375/76

FOREIGN PATENT DOCUMENTS 2905904  8/1980  Fed. Rep. of Germany ........ 375/76

Primary Examiner—Marc E. Bookbinder
Assistant Examiner—M. Huseman
Attorney, Agent, or Firm—Joseph T. Downey; Edward M. Roney; Donald B. Southard

[57] ABSTRACT

An interface circuit is coupled between the last stage of an FSK receiver and a limiter to provide a biasing voltage signal to the limiter. The receiver includes a power saver circuit which supplies power on an interrupted basis. The interface circuit contains maximum and minimum detectors which derive and hold voltages corresponding to the maximum and minimum values of the discriminated signal from the receiver. These maximum and minimum corresponding voltages are averaged in a predetermined manner to provide the biasing voltage to the limiter. Thus, a proper bias voltage level can be accurately and quickly determined, and supplied to the limiter when power is supplied.

17 Claims, 7 Drawing Figures

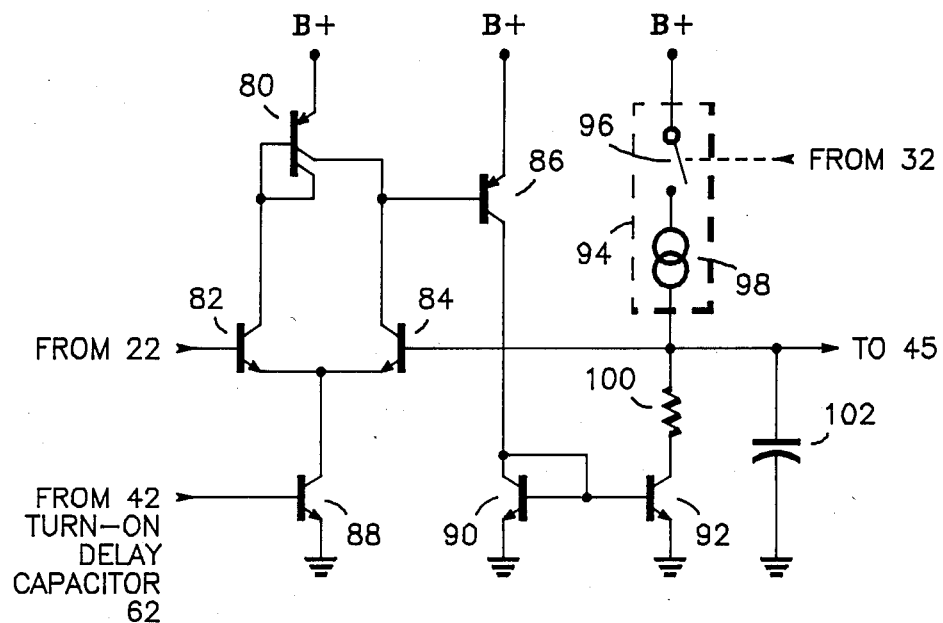
*FIG. 5*
*FIG. 7*
—PRIOR ART—
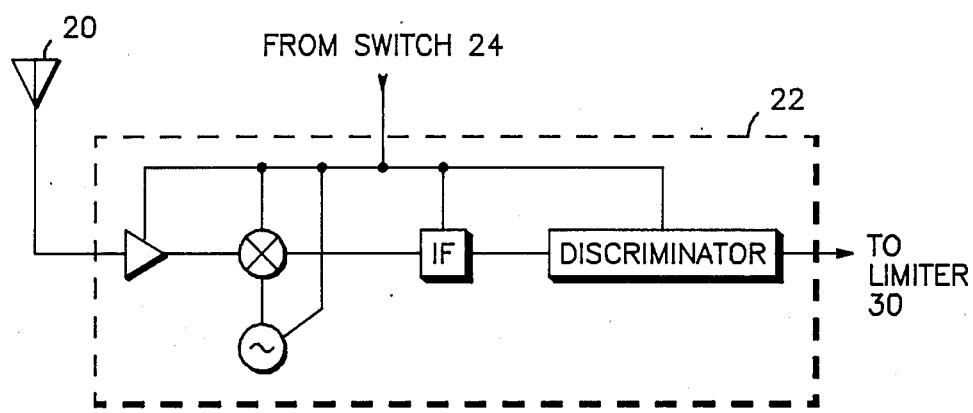

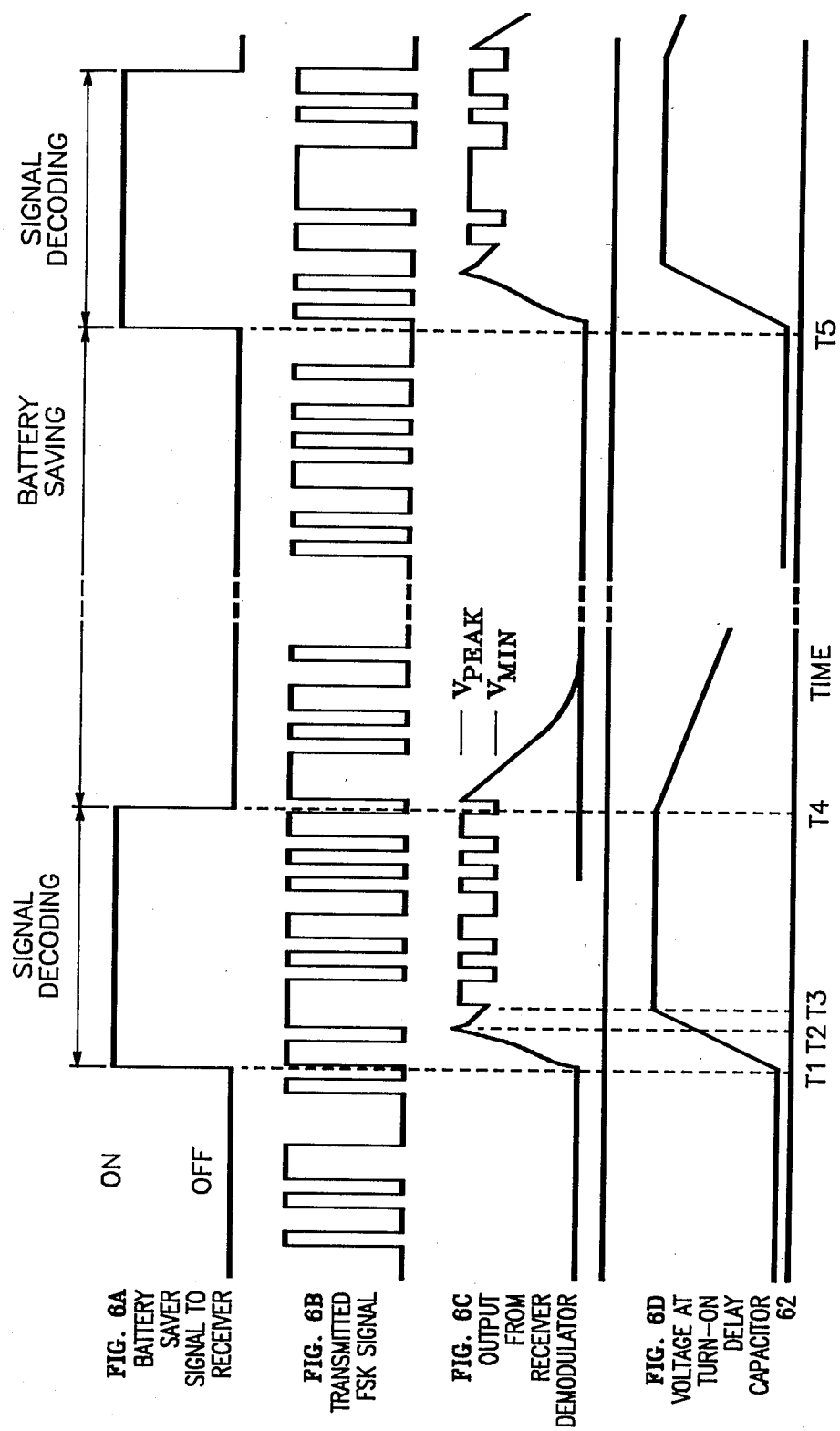

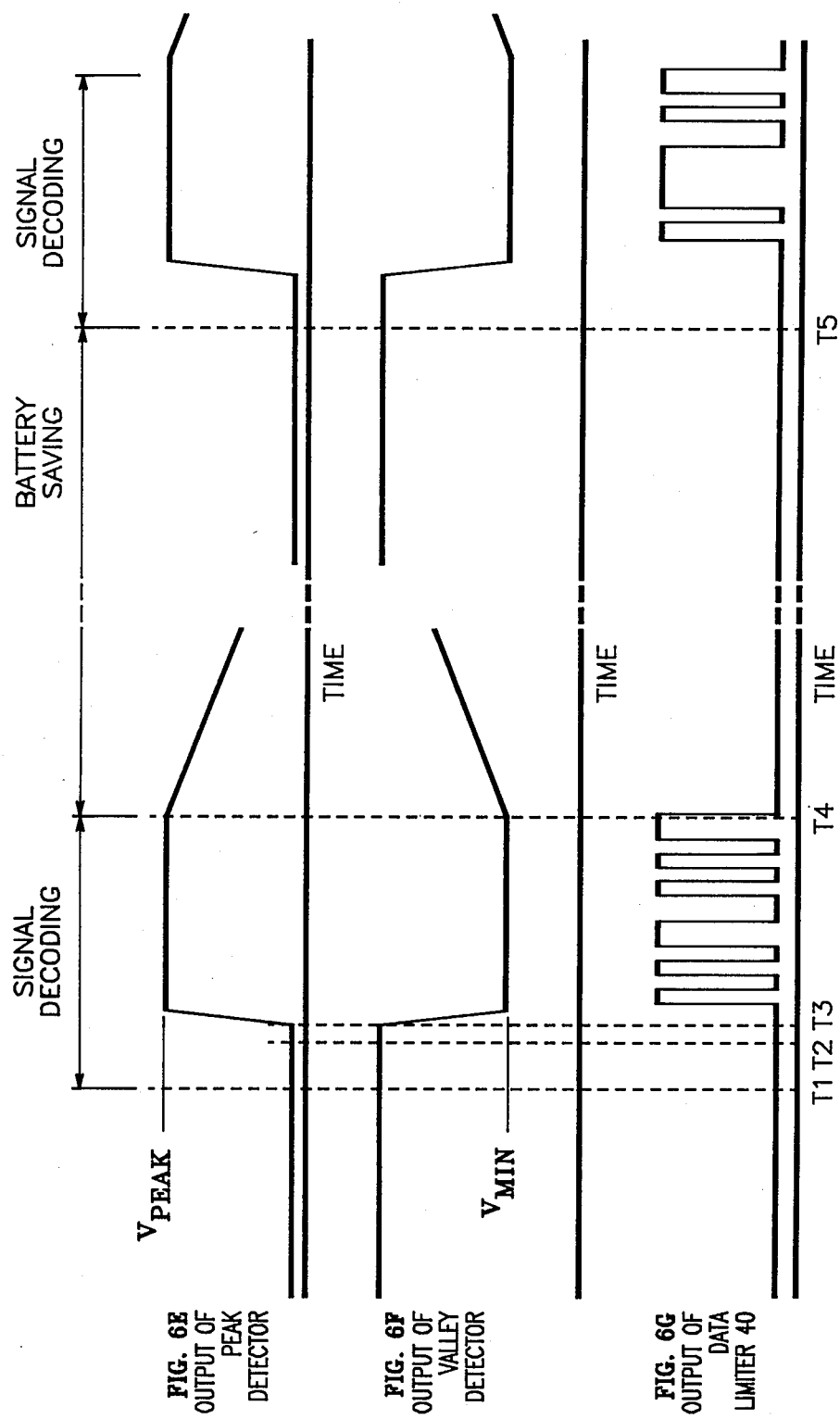

SELF BIASING DIRECT COUPLED DATA LIMITER

BACKGROUND OF THE INVENTION

1. Field of the Invention

The present invention relates to radio receivers which utilize a battery saving technique in which electrical power to the receiver is periodically switched off and on. More particularly, the invention relates to a data limiter that is directly coupled to the output of a receiver, the limiter having maximum and minimum signal level detectors to detect the corresponding values of the received and amplified waveforms and to average these values to automatically and rapidly adjust the bias on the limiter to compensate for changes in the bias voltage level of the receiver output waveform.

2. Background of the Invention

Radio receivers consist of a radio frequency apparatus that both receives and demodulates signals that are transmitted or conveyed over some communications channel. A more specialized form of receiver is a selective calling receiver which also includes a selective signaling decoder that is coupled to the output of the receiver and responds to the reception of predetermined signals. In the case of radio paging devices, for example, the communication channel is a radio frequency link, the communication receiver is a radio receiver and frequently an FM receiver, which demodulates the information that has been impressed on the radio frequency signal, and the decoder responds to predetermined calling signals which may be contained in the demodulated information. The predetermined calling signals identify and actuate an alert in an individual receiver that has been selectively called among a large population of receivers operating on the same radio frequency link.

Paging receivers are generally battery powered and utilize power saving techniques in which the receiver portion and in some cases parts of the decoder are periodically switched OFF and ON in a cyclical manner to conserve power and prolong battery life. A typical battery saver cycle time scheme may switch the receiver ON for approximately 100 miliseconds during every one second interval. During the ON time, the receiver and a signal detection circuit in the decoder are both energized to determine if a first predetermined signal condition has been received. The detection of this first signal condition activates the decoder and disrupts the battery saving power cycling to provide constant power to the receiver and the entire decoder so that selective calling signals can be received and decoded. Otherwise, the ON and OFF power cycling continues indefinitely.

In battery saver radios of this type, there has always been a problem associated with the interface between the discriminator or last stage of the receiver portion, which normally provides the recovered audio signal output, and the input of the signal processing circuitry of the decoder. The problem is that any coupling or interface circuit between the discriminator and the input of the processing circuit must satisfy several sometimes conflicting requirements, in that it must pass relatively low frequency selective calling signals to the processing circuitry; must be capable of responding quickly to signals that are received during the brief ON interval of the battery saver cycle; and must operate properly over a wide range of D.C. and A.C. output signal conditions that can exist at the output of the receiver due to the effects of temperature variations, supply voltage variations, frequency and amplitude shifts in the received signal, and tolerances associated with manufacturing.

The prior art selective signaling receivers respond to either tone or binary coding schemes, and commonly use an audio signal limiter as the first element of the signal processing circuitry of the decoder. This limiter amplifies and "clips" or "limits" the signals that appear at the output of the last stage of the receiver. That is, the limiter generates an output signal that has two amplitude levels which correspond to whether the instantaneous value of its input signal is above or below the average value of the signal. A signal limiter is used because it generates an output signal that has amplitude characteristics that are independent of several problems associated with the receiver including the amplitude and frequency of the input signal at the input of the receiver, manufacturing tolerances of components in the receiver, etc. Such a limiter also functions to eliminate amplitude variations in the recovered signals supplied to it thereby eliminating interferring amplitude modulation noise.

In the past, such a limiter has been capacitively coupled to the output of the receiver. The capacitance operates to help resolve the output bias variation problems that direct coupling could not overcome but a transient problem exists in that the time required to charge such a coupling capacitor has impacted the ability to return the limiter to a stable condition quickly enough after a power off period appropriate for the desired power savings. That is, the time required for the switching transients to die out sufficiently to allow for proper operation of the limiter can be quite long relative to the desired 100 millisecond ON period of a typical battery saver cycle. In a paging application, the bias on the limiter must be stabilized to within a few millivolts of its steady-state operating conditions in order to generate the correct zero crossings in the waveform that appears at the output of the limiter. As a result, a time interval equal to several time constants of the interstage coupling network must elapse after the circuitry is switched on before the limiter can be fully operational.

Since the receiver must be capable of receiving and decoding signals during the 100 millisecond ON period, the transient problem associated with the capacitive coupling would, if not corrected, require that the receiver be turned ON well before signal decoding is to begin, resulting in a longer effective ON time and a correspondingly reduced battery life.

This problem is particularly acute in pagers that use FSK binary signaling in that the coupling capacitor must be large enough to pass bit patterns that contain long strings of consecutive 1's or 0's without a DC level shift. This requirement means that the coupling network between the last stage of the receiver and the limiter must have a very long RC time constant which would be on the order of seconds. Such a long time constant would be diametrically opposed to the requirement for quickly establishing a stable operating condition when the receiver is switched on after a power off period of the battery saver circuit.

FIG. 1 describes in functional block diagram form the operation of a prior art receiver. An antenna 20 is coupled to a receiver 22. A B-plus voltage supply is coupled to receiver 22 through a switch 24. The output of receiver 22 is coupled through a switch 26 to a coupling capacitor 28, and ultimately to an input terminal of a data limiter 30. Battery saver circuit 32 is shown by a broken line as controlling the operation of switches 24 and 26. The output of the data limiter 30 is coupled to a signal processor 34. Switch 24 is also coupled to data limiter 30 and signal processor 34.

FIG. 1 shows one of several approaches that were developed in an attempt to solve the transient switching problem for battery saver receivers. Switch 26 is preferably a transistor switch connected in series with coupling capacitor 28 to isolate capacitor 28 when receiver 22 is in the off state as directed by battery saver circuit 32. That is switch 26 is open when the battery saver circuit switches receiver 22 off to avoid discharging capacitor 28 during the off mode of the duty cycle. Then when receiver 22 is switched on, switch 26 is closed to reconnect the limiter but the bias voltage on the capacitor 28 should be at substantially the magnitude required for proper operation. However, the circuit as exemplified in FIG. 1 does not work very well especially for very long battery saver off periods such as a 20 second interval. This is a result of the fact that leakage in the capacitor can cause a substantial discharge during the long OFF time period and thus cause a switching transient when the limiter is reconnected.

FIG. 2 is a functional block diagram of a second prior art approach to resolve the cycling problem of battery saver receivers. FIG. 2 shows an antenna 20 coupled to receiver 22 as before. A source of positive B-plus voltage is coupled through a switch 24 to receiver 22. The output of receiver 22 is coupled through a coupling capacitor 28 to a data limiter circuit 30. A battery saver circuit 32 is shown by a broken line as controlling switch 24 and, a signal processor 34 is coupled to the output of limiter 30. Switch 24 is also coupled to data limiter 30 and signal processor 34. A source of B-plus voltage is coupled to the emitter of a PNP transistor 36 whose collector is coupled through a resistor 37 to capacitor 28 and an input terminal of limiter 30. A control output of battery saver 32 is also coupled to a precharge control circuit 38 which is in turn coupled to the base of transistor 36.

The function of transistor 36 in its present position is to rapidly charge coupling capacitor 28 to the required bias level and thus shorten the length of the transient period that follows the off to on battery saver transition. Thus when the battery saver is first switched on, switch 24 is closed under the control of battery saver circuit 32. Transistor 36 functions as a simple switch which is used to lower the RC time constant of the coupling network between receiver 22 and the limiter 30 to allow the proper bias voltage level to be rapidly established on capacitor 28. Thus in effect, the RC time constant is altered to the value needed for proper operation of limiter 30 when power is restored.

This technique has been used with reasonable success, but it suffers from the problem that for FSK binary signalling the received bit stream must have nearly a fifty percent duty cycle of 1's and 0's during the time that capacitor 28 is being rapidly charged, otherwise the resultant bias voltage established on capacitor 28 is not the appropriate level needed for the correct operation of limiter 30.

SUMMARY OF THE INVENTION

The present invention provides an interface apparatus having all the desired characteristics which satisfy the conflicting requirements and is the best approach to solve all of the transient problems without compromising performance in one or more areas.

It is an object of the present invention to provide a signal interface apparatus which meets the conflicting requirements as to temperature, frequency, supply voltage, and signal condition variations of a desired signal limiter. It is a further object of the present invention to provide a noncapacitive, direct coupled signal interface circuit which operates well under the known parametric variations and signal conditions. It is still a further object of the present invention to provide a signal interface circuit which derives a bias level from the received and detected signals by suitably averaging them in a predetermined manner and supplying that average value to a differential amplifier for limiting the signals for further signal processing.

A frequency shift keying receiver has a plurality of radio frequency elements, the last stage of which is a discriminator, and includes power switching means coupled to a power source for periodically supplying power to the elements. A limiter interface circuit is coupled to the discriminator and comprises: a signal limiter directly coupled to the discriminator, a first detection means having an input coupled to the discriminator for detecting a peak or maximum signal magnitude and producing a corresponding output signal; a second detection means having an input coupled to the discriminator for detecting a valley or minimum signal magnitude and producing a corresponding output signal; and means coupling the output signals from the first and second detection means to the limiter to provide a reference signal.

BRIEF DESCRIPTION OF THE DRAWINGS

FIG. 5 is an electrical schematic diagram of the valley follower circuit shown in FIG. 3.

FIGS. 6A, B, C, D, E, F, and G are wave forms for identified points in FIGS. 3, 4 and 5.

FIG. 7 is a block diagram of a typical receiver.

DESCRIPTION OF THE PREFERRED EMBODIMENT

Figure 3:
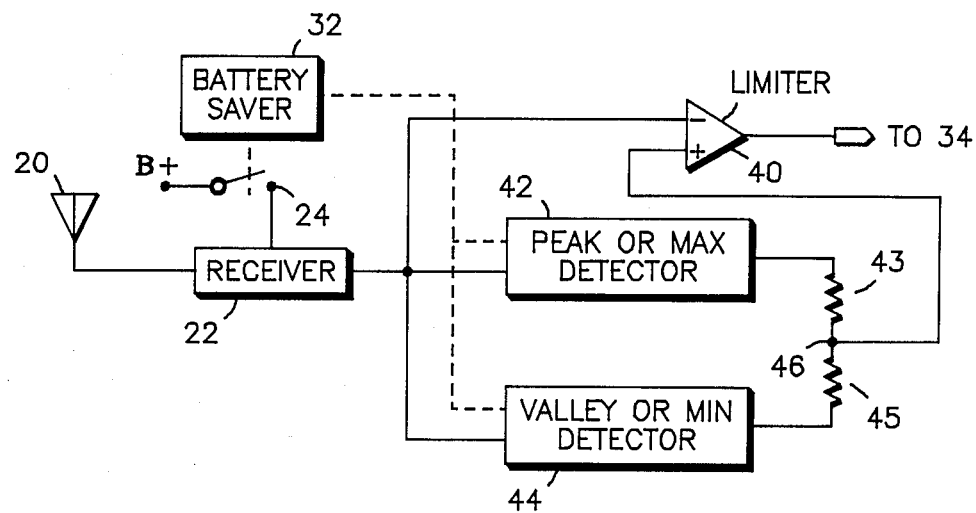
FIG. 3 is a functional block diagram of the interface circuitry of the present invention.

Referring now to the drawings wherein like reference numerals designate identical or corresponding parts throughout the several views, FIG. 3 shows a functional block diagram of the preferred embodiment of the interface circuitry of the present invention. An antenna 20 is coupled to receiver 22. A source of B-plus voltage is coupled through a switch 24 to supply power to receiver 22 and, as shown by a broken line, battery saver circuit 32 operates to control the switching operation of switch 24. The output of receiver 22 is coupled to the negative input terminal of an operational amplifier 40 used as a limiter, to an input terminal of a peak or maximum follower circuit 42 and to an input terminal of a valley or minimum follower circuit 44. Battery saver circuit 32 also controls switching operations in Peak detector 42 and Valley detector 44 as shown by a broken line. The terms detector or follower are used interchangeably for circuits 42 and 44. The output of peak follower circuit 42 is coupled through a resistor 43 and the output valley follower circuit 44 is coupled through a resistor 45 to junction 46. Junction 46 is coupled to the positive input terminal of limiter 40. The output of limiter 40 is supplied to a signal processor circuit 34. Limiters of the type usable in this embodiment are well known in the art and any of several differential amplifiers may be used including an operational differential amplifier.

In the circuit for the preferred embodiment, FIG. 3, of the present invention, peak follower circuit 42 and valley follower circuit 44 are coupled to the output of the receiver 22 to receive audio output signals and are used to detect and hold respectively the maximum and minimum values of the output voltage signals emanating from the last stage of receiver 22. The output values of the peak follower and valley follower circuits $V_{MAX}$ and $V_{MIN}$ respectively are averaged by a resistor network composed of resistors 43 and 45 coupled in a voltage divider arrangement. The mean value of the maximum and minimum voltage weighted by means of the predetermined relative magnitudes of resistors 43 and 45 is applied to the positive reference terminal of limiter 40 to provide a bias voltage level to the limiter. The bias level may be at either a midway point between the maximum and minimum value or at a selected weighted point between the AC excursions of the audio voltage signals. The output from receiver 22 is also coupled directly to the negative input terminal of limiter 40. Thus the limiter may perform its operation of clipping the audio signals and thus keeping interfering noise low by removing excessive amplitude variations in the signal.

As may be seen in the structure of the circuit of FIG. 3 an advantageous feature of the present invention is that the output of the last stage of receiver 22 can be directly coupled to the limiter without the presence of any coupling capacitor. Thus all of the component variations and drifts normally occurring in the manufacture and use of such battery saver receivers can be compensated by the interface circuit of the present invention. Thus, utilization of the present invention has the advantage of completely eliminating an expensive, troublesome, and physically large part from the radio receiver system, the prior art coupling capacitor.

The operation of the limiter interface circuit of the present invention is especially important in selective call signalling. During FSK binary signalling the encoded binary signal is sent via an RF frequency signal and is received through antenna 20 and processed through the receiver 22 and supplied to the limiter 40. The voltage level of the signal at the output of the receiver represents the coded binary data as received by the receiver. It is this binary data which must be limited so as to be correctly interpreted by the signal processor 34.

Figure 1:
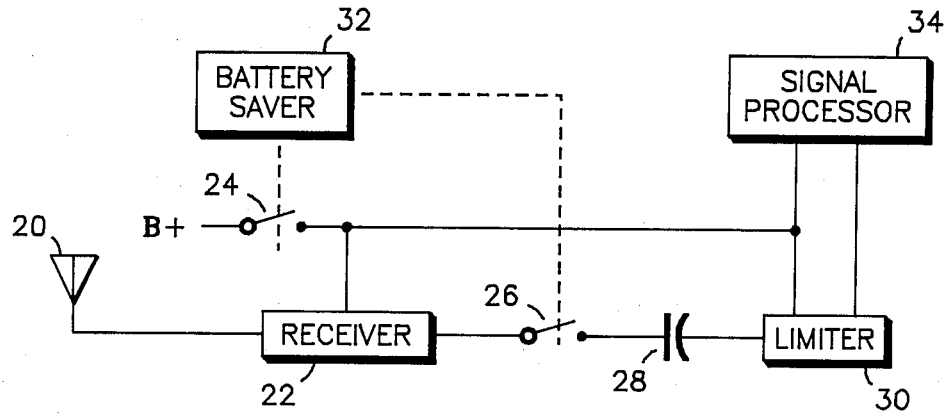
FIG. 1 is a functional block diagram of a prior art interface coupling a battery saver receiver to a limiter.
Figure 2:
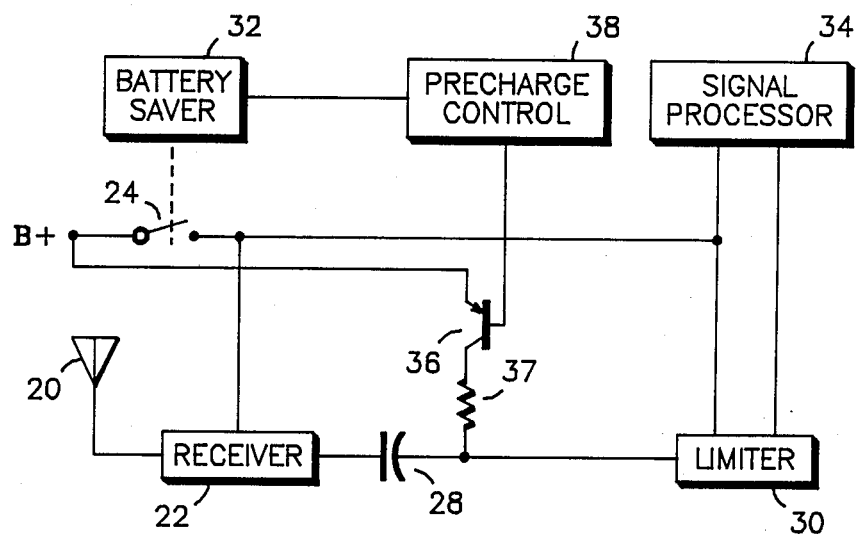
FIG. 2 is a functional block diagram of another prior art interface coupling a battery saver receiver to a limited utilizing.

In addition, the operation of the averaged peak/valley follower limiter is that it automatically adjusts the bias on limiter 40 to compensate for changes in the bias of the audio output regardless of the signal level pattern of the received binary FSK signals. In the case as described for the prior art system of FIG. 2, it was required that a fifty percent duty cycle of 1's and 0's be provided so that the proper adjustment on the capacitor holding voltage could be achieved. By contrast, in the case of the present invention, it is unnecessary to have any predetermined duty cycle realtionship in either 1's or 0's as any combination would be appropriate and allow suitable averaging to automatically adjust the bias for whatever signals had been detected.

Thus, the elimination of a capacitive circuit element coupled between receiver 22 and limiter 40 is a significant improvement in the operation of the device. When the receiver is turned on during a battery saving cycle the presence of a prior art capacitor adds considerably to the time requirement for the limiter to reach a bias voltage at which it can correctly distinguish 1's from 0's as encoded by the RF signal. Thus, at the end of every receiver off cycle, it is necessary to have the limiter return to full operating voltage to enable it to distinguish bewteen 1's and 0's as quickly as possible when the power cycle comes on, otherwise portions of the binary encoded signal may be lost as result.

For the circuit of the preferred embodiment of the present invention, tests have shown that this circuit can generate the proper bias level within as little as one bit interval following a bit transition, that is only one bit interval at each level is required to generate the proper bias on the limiter. This allows the receiver to be quickly switched off and on for any duration to achieve an efficient battery saver operation and should be compared very favorably with the considerably longer time that is required to cause capacitively coupled limiters to come up to a bias voltage so that they can appropriately limit information in the receiver signal.

Figure 4:
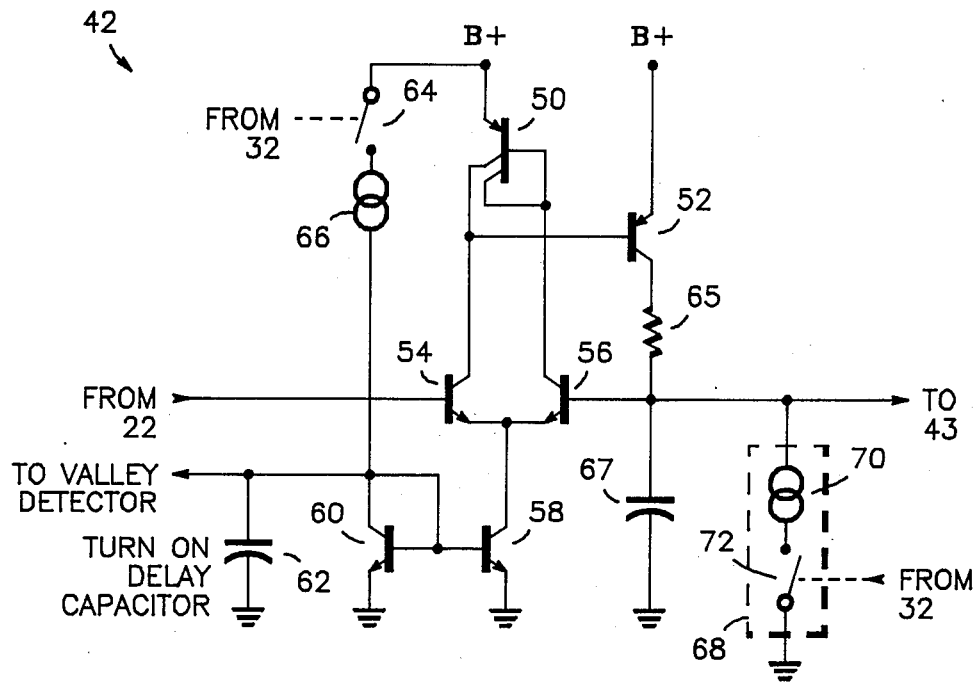
FIG. 4 is an electrical schematic diagram of the peak follower circuit shown in FIG. 3.

FIG. 4 shows a detailed electrical schematic of peak follower circuit 42 for the preferred embodiment of the present invention. A source of B-plus voltage is supplied to the emitter of a PNP transistor 50 having a split collector. One portion of the split collector of transistor 50 is coupled to the base of a PNP transistor 52 and to the collector of an NPN transistor 54. The second portion of the split collector of transistor 50 is coupled to its base and to the collector of an NPN transistor 56. The emitters of transistors 54 and 56 are coupled together and to the collector of NPN transistor 58.

The emitter of transistor 58 is connected to ground, and its base is connected to the base and collector of transistor 60 and to a first terminal of a capacitor 62. The second terminal of capacitor 62 and the emitters of transistors 58 and 60 are each connected to ground. The first terminal of capacitor 62 is also coupled to valley follower circuit 44. A source of B+ voltage is connected through a switch 64 to a current source 66 which is in turn connected to the collector of transistor 60. Switch 64 is shown by a broken line as being responsive to battery saver circuit 32. The input signal from receiver 22 is applied to the base of transistor 54.

The source of positive B-plus voltage is also applied to the emitter of transistor 52 whose collector is coupled through a resistor 65 to the base of transistor 56, through a holding capacitor 67 which is subsequently coupled to ground, and through a circuit arrangement enclosed by a broken line box and designated 68 which consists of a series arrangement of a current sink 70 and a switch 72 coupled to ground. Switch 70 is shown in an open mode and as shown by a broken line is responsive to battery saver circuit 32. The signal on the base of transistor 56 provides the output supplied to resistor 43 in the voltage divider network for the peak-valley averaging of the limiter bias.

In operation, transistors 50, 52, 54 and 56 form a high gain amplifier with a differential input stage. The amplifier, coupled to holding capacitor 67, acts to charge capacitor 67 to the highest instantaneous voltage level that is present in the signal applied to the base of transistor 54. Specifically, the differential amplifier formed by transistors 54, 56 and 50 compares the voltage on the base of transistor 54 with the voltage on the base of transistor 56, and supplies base current to transistor 52 wherever the voltage at the base of transistor 54 is higher than the voltage at the base of transistor 56. Otherwise, transistor 52 is held off or non-conducting. This mode of operation is provided by the use of current mirror device 50 which supplies a current at its output collector that is equal to the collector current of transistor 56. Thus, transistor 52 is turned on and charges the holding capacitor 67 through resistor 64 whenever the input voltage at the base of transistor 54 exceeds the voltage on the holding capacitor 67, and it charges the capacitor during the peaks of the input signal until the output voltage on capacitor 67 equals the value of the peak voltage in the input waveform.

In the amplifier, transistors 58 and 60 form a current mirror that mirrors or reflects the current from current source 66 into a collector current for transistor 58 that biases the differential amplifier at a precise operating current. The purpose of capacitor 62 is to generate a slight delay between the time when the battery saver closes switch 64 at the start of the ON period, and the time at which peak follower 42 is operational. The delay is equal to the time that is required for the current from current source 66 to charge capacitor 62 to the base-emitter voltage required to turn ON current mirror transistors 58 and 60. For a typical base-emitter voltage of 0.6 volts and a current source output of 10 microamps, a 0.18 microfarad capacitor generates a 10 milliseconds turn ON delay. The turn-on delay aspect of the peak-follower circuit will be discussed in detail later in conjunction with the description of the overall system timing.

Circuit 68 shows a current sink 70 which is switched by the battery saver circuit 32. The discharge current sink 70 is switched into the circuit during the OFF portion of the battery saver cycle to insure that when the battery saver circuit goes ON, the voltage on capacitor 67 is reduced and correspondingly the voltage on the base of transistor 56 is reduced to a value below the lowest possible peak signal level. Thus, the peak follower output signal is initialized to allow the peak follower to operate properly during the next ON period and it may be seen that the circuit operates as a true peak detection circuit.

In the preferred embodiment, circuit arrangement 68 comprises a current sink that is switched on and off in responsive to the battery saver circuit 32. More specifically, the current source is switched on when the battery source is in the OFF Mode, and switched off when the battery saver is in the ON mode. This allows the voltage on capacitor 67 to be drained during each off cycle of the battery saver operation to insure that when power is restored, the retained value of the maximum is not above the correct value which will be quickly determined from the information received from receiver 22. In the alternative, although not shown, circuit arrangement 68 could be replaced by a dissipation resistor of suitable magnitude which would rapidly lower the voltage to achieve initialization. The maximum detected signal is held as the equivalent of a voltage on holding capacitor 67 and this value is supplied to the voltage divider network.

FIG. 5 shows the detailed electrical schematic diagram of the valley follower 44 for the preferred embodiment of the present invention. A source of positive B-plus voltage is supplied to the emitter of a PNP transistor 80 having a split collector. One portion of the split collector is coupled to the base of transistor 80 and to the collector of a NPN transistor 82. The other portion of the split collector is coupled to the collector of an NPN transistor 84 and to the base of a PNP transistor 86. Transistors 82 and 84 have their emitters coupled together and to the collector of transistor 88. The emitter of transistor 88 is connected to ground. The base of 88 is coupled to the first terminal of turn on delay capacitor 62 shown in peak follower circuit 42 of FIG. 4. The input from receiver 22 is applied to the base of transistor 82. A source of B-plus positive voltage is applied to the emitter of transistor 86 whose collector is coupled to the collector and base of an NPN transistor 90 and to the base of an NPN transistor 92. The emitters of transistor 90 and 92 are each separately connected to ground.

A source of positive B-plus voltage is coupled through a circuit arrangement enclosed by a broken line box and designated 94, which consists of a switch 96 in series with a current source 98. Current source 98 is coupled to the base of transistor 84, through a charging resistor 100 to the collector of transistor 92 and through a holding capacitor 102 to ground. Switch 96 is shown in the open mode and is responsive to battery saver circuitry 32. The signal level on the base of transistor 84 provides the output supplied to resistor 45 in the voltage divider network.

In operation, transistors 80,82,84,86,90 and 92 form a high gain amplifier with a differential input stage. The amplifier, together with holding capacitor 102, acts to discharge capacitor 102 to the lowest instantanous voltage level that is present in the signal which is applied to the base of transistor 82. The operation of the circuit is similar to the operation of the peak follower 42 described previously, except that the polarity of the input connections are reversed, and a current sink mirror is connected to the output of the PNP transistor 86 to generate a discharge current equal to the collector current of the transistor 86.

Thus, the differential amplfer formed by transistors 80,82 and 84 compares the voltage on the base of 82 with the voltage on the base of 84, and supplies base current to transistor 86 whenever the voltage at the base of 82 from receiver output 22 is less than the voltage at the base of 84. Otherwise, transistor 86 is held off or non-conducting. This mode of operation is again provided by the use of current mirror 80 which supplies a current at its output collector that is equal to the collector current of transistor 82 thus effecting the current subtraction at the output of the differential amplifier.

Thus, transistor 86 is turned ON and generates a current into diode connected transistor 90 whenever the input voltage at 22 is less than the voltage on the holding capacitor 102. This current is mirrored by the current mirror formed by transistor 90 and 92 to generate a current that discharges capacitor 102 through resistor 100. Thus, capacitor 102 is discharged whenever the input voltage from the receiver 22 is less than the voltage on the holding capacitor, and it is discharged during the occurence of valley's or minimum signal periods until the output voltage on capacitor 102 equals the value of the minimum voltage in the input waveform.

Thus, it may be seen that the circuit operates as a true valley detection circuit.

In the amplifier, transistor 88 serves to mirror the current flowing into diode connected transistor 60 from current source 66 (as shown in FIG. 4) to establish a precise operating current for the differential amplifier. Here again, the turn-on of current source transistor 88 is delayed by the charging of delay capacitor 62 so that there is a slight delay of approximately 5 to ten milliseconds between the start of the battery saver ON period and the time when the valley follower is fully operational.

Circuit arrangement 94 comprises a current source that is switched ON and OFF in response to the battery saver circuit 32. Specifically, the current source is switched ON when the battery saver is in the OFF mode, and switched OFF when the battery saver is in the ON mode. This allows the voltage on holding capacitor 102 to be charged during each off cycle of the battery saver operation to insure that when power is restored the retained minimum is not below the correct value which will be quickly determined from the information received from receiver 22. Thus, the detector signal may be initialized. In the alternative, circuit arrangement 94 could be replaced by a charging resistor of suitable magnitude to achieve similar initialization. The minimum detected signal is held as the equivalent of a voltage on holding capacitor 102 and this value is supplied to the voltage divider network.

FIG. 6 shows a series of signal voltage vs time waveforms at various points in FIGS. 3, 4, and 5. FIG. 6A shows the waveform for the power signal from battery saver circuit 32, as shown in FIG. 3. It will be observed that signal decoding can take place during the positive voltage portion or power ON time of this signal and that battery saving occurs during the OFF time.

FIG. 6B shows an arbitrary signal waveform for a typical transmitted FSK signal which would then be encoded preferrably in frequency modulation form and impinge on antenna 20 to be directed to the various radio frequency detection demodulation circuits of receiver 22.

FIG. 6C shows the waveform for the output of the demodulator, or last stage of receiver 22 as shown in FIG. 7. When the power ON signal is supplied to receiver 22, the receiver components cannot instantaneously recover FSK information and there is a corresponding short time during which the receiver is incapable of detecting and demodulating FSK information. During this period, the demodulator output may exhibit a transient response characteristic in which the output voltage gyrates widely before establishing a steady state d.c. level. The length of this transient period is dependent of the the design of the radio receiver, but it is typically short, and is on the order of one bit interval for FSK receivers. Thus, following the start of the battery saver ON period at time designated as T1, the output of the demodulator increases from a very low level up to a transient peak at time designated as T2 and subsequently reaches a steady state condition at time designated as T3. Subsequent to this short transient period, the FSK encoded signal may be observed at an elevated DC voltage level bounded by Vmax and Vmin. When the battery saver signal supplied to the receiver is in the power OFF mode, the output of the receiver decays with a natural time constant to return the output voltage to the original base level.

FIG. 6D shows the waveform that appears at the turn-on delay capacitor 62. After the battery saver starts the ON period at time T1, the voltage on capacitor 62 raises linearly until it reaches its final value at time T3, at which point the peak and valley follower circuits are enabled. The length of the delay has been selected such that the peak and valley followers are enabled (T3) after the transients in the demodulator output have ended (T2).

FIG. 6E shows the waveform for the output signal of peak follower 42 as shown in FIG. 4 which is supplied to the voltage divider network. During the OFF period and the short time-out period associated with the charging of the turn on delay capacitor 62, the output of the peak follower remains at a low level. Then after delay capacitor 62 has been fully charged and current source transistor 58 has turned ON, the output of the peak follower is quickly driven to the peak level of the input signal.

During the period in which the peak follower circuit is charging the holding capacitor 67, the maximum rate of charge is limited by the value of resistor 64. In practice, the time constant formed by resistor 64 and the holding capacitor 67 are set to a value on the order of one-half of a bit interval to prevent the circuit from responding to short noise spikes.

At the end of the battery saver ON time at T4, the discharge current source 70 is switched into the circuit by switch 64 to discharge the holding capacitor to a low voltage to insure that the peak follower will correctly indicate the correct peak signal level when the circuit is turned ON again.

FIG. 6F shows the waveform for the output signal of valley or minimum follower 44 as shown in FIG. 5 which is supplied to the voltage divider network. During the OFF period and the short delay period associated with the charging of the turn-on delay capacitor 62, the output of the valley follower remains at a high level. Then, after delay capacitor 62 has been fully charged and the current source transistor 88 has turned ON, the output of the peak follower is quickly driven to the minimum level of the input signal.

During the period in which the valley follower circuit is discharging the holding capacitor 102, the maximum rate of discharge is limited by resistor 100. In practice, the time constant formed by resistor 100 and the holding capacitor 102 are set to a value on the order of one-half of a bit interval to prevent the circuit from responding to short noise spikes.

At the end of the battery saver ON time (at T4), the charging current source 98 is switched into the circuit by switch 96 to charge holding capacitor 102 to a high voltage to insure that the valley follower will correctly, and quickly indicate the correct minimum signal level when the circuit is turned ON again.

Finally, FIG. 6G shows a typical output of data limiter 40 and in particular shows the recovered bit pattern that appears at the output of the data limiter which is supplied to signal processor 34.

Obviously, numerous (additional) modifications and variations of the present invention are possible in light of the above teachings. It is therefore to be understood that within the scope of the appended claims, the invention may be practiced otherwise than as specifically described herein.

What is claimed is:

1. In a frequency shift keying receiver having a plurality of radio frequency elements including a discriminator which is the last stage of said elements, said receiver including power switching means coupled to a power source for periodically supplying power to said elements, a limiter interface circuit coupled to said discriminator, comprising:

a signal limiter directly coupled to said discriminator;

first detection means having an input coupled to said discriminator for detecting a peak or maximum signal magnitude and producing an output signal corresponding thereto;

second detection means having an input coupled to said discriminator for detecting a valley or minimum signal magnitude and producing an output signal corresponding thereto;

said first and second detection means being coupled to said power switching means and said first and second detection means each include means, responsive to said power switching means, for initializing the magnitudes of the corresponding output signals; and means coupling the output signals from said first and second detection means to said signal limiter to provide a reference signal thereto.

2. The interface circuit of claim 1, wherein said limiter has a signal input terminal and a reference input terminal, said signal input terminal is directly coupled to said discriminator and said coupling means comprises voltage dividing means for selectively weighting and averaging the output signals from said first and second detection means to provide a bias reference signal to the reference input terminal of said limiter.

3. The interface circuit of claim 2 wherein said limiter comprises a differential amplifier.

4. The interface circuit of claim 2 wherein said voltage dividing means provides equal weighting to the output signals from said first and second detection means.

5. The interface circuit of claim 1 further including signal processing circuitry coupled to the output of said limiter to identify the reception of selective calls.

6. The interface circuit of claim 5, wherein said limiter has a signal input terminal and a reference input terminal, said signal input terminal is directly coupled to said discriminator, said coupling means comprises voltage dividing means for selectively weighting and averaging the output signals from said first and second detection means to provide a bias reference signal to the reference input terminal of said limiter.

7. The interface circuit of claim 6 wherein said receiver further includes signal processing circuitry and said limiter comprises a differential amplifier whose output is coupled to said signal processing circuitry.

8. The interface circuit of claim 6 wherein said voltage dividing means provides equal weighting to the output signals from said first and second detection means.

9. The interface circuit of claim 1, wherein said limiter has a signal input terminal and a reference input terminal, said signal input terminal is directly coupled to and receiving output signals from said discriminator and said coupling means comprises voltage dividing means for selectively weighting and averaging the output signals from said first and second detection means to provide a bias reference signal to the reference input terminal of said limiter.

10. The interface circuit of claim 9 wherein said limiter comprises a differential amplifier.

11. The interface circuit of claim 9 wherein said voltage dividing means provides equal weighting to the output signals from said first and second detection means.

12. The interface circuit of claim 9 wherein said first and second detection means further include delay means, responsive to said power switching means, to delay the detection means output signals for a sufficient time to allow the decay of any transients in the discriminator output signals.

13. A frequency shift keying radio receiver comprising:

a receiver circuit containing a plurality of radio frequency elements including a discriminator for the reception and detection of broadcast signals;

power switching means coupled to a source of power for periodically supplying power to said radio frequency elements;

a limiter directly coupled to said discriminator to limit amplitude variations in a received signal and to produce a limited output signal;

first detection means having an input coupled to said discriminator for detecting a peak or maximum signal magnitude and producing an output signal corresponding thereto;

second detection means having an input coupled to said discriminator for detecting a valley or minimum signal magnitude and producing an output signal corresponding thereto;

said first and second detection means being coupled to said power switching means and said first and second detection means each include means, responsive to said power switching means, for initializing the magnitudes of the corresponding output signals; and averaging means coupling the output signals from said first and second detection means to weigh and average the magnitudes of the output signals in a predetermined manner and supply reference signals to said limiter;

whereby said limiter is always biased in accordance with a predetermined averaging of the received and discriminated signals.

14. The receiver of claim 13 further including signal processing circuitry coupled to the output of said limiter to identify the reception of selective calls.

15. The receiver of claim 14, wherein said limiter comprises a differential amplifier which has a signal input terminal directly coupled to and receiving output signals from said discriminator and a reference input terminal coupled to said averaging means.

16. The interface circuit of claim 15 wherein said first and second detection means further include delay means, responsive to said power switching means, to delay the detection means output signals for a sufficient time to allow the decay of any transients in the discriminator output signal.

17. In a frequency shift keying receiver having a plurality of radio frequency elements including a discriminator which is the last stage of said elements, said receiver including power switching means coupled to a power source for periodically supplying power to said elements, a limiter interface circuit coupled to said discriminator, comprising:

a signal limiter directly coupled to said discriminator and receiving output signals therefrom;

first detection means having an input coupled to said discriminator for detecting a peak or maximum signal magnitude and producing an output signal corresponding thereto;

second detection means having an input coupled to said discriminator for detecting a valley or minimum signal magnitude and producing an output signal corresponding thereto;

said first and second detection means being coupled to said power switching means and said first and second detection means each include means, responsive to said power switching means, for initializing the magnitudes of the corresponding output signals;

said first and second detection means further including delay means, responsive to said power switching means, to delay the detection means output signals for a sufficient time to allow the decay of any transients in the discriminator output signals; and means coupling the output signals from said first and second detection means to said signal limiter to provide a reference signal thereto.

* * * * *